United States Patent
Su et al.

(10) Patent No.: US 7,764,624 B2
(45) Date of Patent: Jul. 27, 2010

(54) METHODS AND DEVICES FOR PREVENTING PROTOCOL STALLING

(75) Inventors: Hsuan-Jung Su, Ocean, NJ (US); Qinqing Zhang, Morganville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1551 days.

(21) Appl. No.: 10/198,591

(22) Filed: Jul. 18, 2002

(65) Prior Publication Data
US 2004/0013087 A1 Jan. 22, 2004

(51) Int. Cl.
*H04L 1/18* (2006.01)
*H04L 12/26* (2006.01)
*H04L 12/66* (2006.01)
*H04L 12/42* (2006.01)
*H04J 1/16* (2006.01)
*H04J 3/24* (2006.01)

(52) U.S. Cl. .......... 370/253; 370/356; 370/392; 370/394; 370/449; 370/474; 714/748

(58) Field of Classification Search .......... 714/748–749
See application file for complete search history.

(56) References Cited

U.S. PATENT DOCUMENTS

| | | | | |
|---|---|---|---|---|
| 5,084,877 A | * | 1/1992 | Netravali et al. | 714/748 |
| 5,222,061 A | * | 6/1993 | Doshi et al. | 370/394 |
| 6,424,625 B1 | * | 7/2002 | Larsson et al. | 370/236 |
| 6,473,399 B1 | * | 10/2002 | Johansson et al. | 370/229 |
| 6,643,813 B1 | * | 11/2003 | Johansson et al. | 714/748 |
| 6,907,005 B1 | * | 6/2005 | Dahlman et al. | 370/236 |
| 6,947,394 B1 | * | 9/2005 | Johansson et al. | 370/282 |
| 7,000,021 B1 | * | 2/2006 | Radhakrishnan et al. | 709/230 |
| 7,013,419 B2 | * | 3/2006 | Kagan et al. | 714/749 |

* cited by examiner

*Primary Examiner*—Melanie Jagannathan
(74) *Attorney, Agent, or Firm*—Capital Patent & Trademark Law Firm, PLLC

(57) ABSTRACT

The present invention provides techniques for preventing protocol stalling. A control platform is adapted to generate a predetermined time period, wherein the predetermined time period is reset when an acknowledgement signal is received. The control platform is further adapted to examine stored packets to detect new or negatively acknowledged packets. A transmission platform is adapted to transmit an earliest transmitted packet after the predetermined time period expires when no new or negatively acknowledged packets are detected.

17 Claims, 5 Drawing Sheets

METHODS AND DEVICES FOR PREVENTING PROTOCOL STALLING

FIELD OF THE INVENTION

This invention relates to the fields of wireless and wire line communication networks and, more specifically, to methods and devices for preventing protocol stalling.

BACKGROUND OF THE INVENTION

A common function of a data communication system is to successfully send data "packets" containing desired information from a transmission point or node to a reception point or node. Before going further, it should be understood that the term "node" may indicate one or more hardware, software or firmware elements which may be combined or used separately to carry out transmission and/or reception of packets, etc. . . . . In order for such a system to perform efficiently, bits of information are grouped together to form an "upper layer frame". Upper layer frames are then further subdivided or concatenated into packets, the basic units used for transmission in a communication network.

A communication network's efficiency is measured by how many packets it can successfully send from a transmission node to a reception node in a given time period. This measurement is known as a network's "throughput". Another measure of network efficiency is the amount of time it takes for a packet to get from a transmission node to a reception node. This performance metric is known as "delay". An ideal communication network will transmit the maximum amount of packets between network nodes in the least amount of time.

Several factors prevent both wire line and wireless communication networks from achieving ideal throughput and delay performance. Principally among them are transmission failures caused by interference, weak transmissions or faulty reception. One known technique used to minimize network transmission failures utilizes an Automatic Repeat Request (ARQ) retransmission method of error correction. ARQ retransmission uses a "reverse acknowledgement" channel. This channel can be a stand-alone channel or multiplexed with a "reverse data channel". A reverse acknowledgement channel allows a reception node to provide a transmission node with the status of transmitted packets. These status messages are aptly called "acknowledgements".

ARQ retransmission is used, for example, in a radio link control protocol developed for third generation, 3G communication networks (3G is short for third generation, 3GPP/UMTS radio link protocol communication networks). These networks support wireless bandwidth requirements for telephone calls, global positioning systems, email, Internet access, videoconferencing and streaming audio and video. Today, 3G networks allow data to be transmitted between a transmission node and reception node over a range of 8 kb/sec to 2 MB/sec. Future enhancements may enable 3G networks to transmit data up to 10 MB/sec. An efficient ARQ retransmission method is essential in order to maintain network protocol integrity for commercial applications, especially when it comes to 3G networks which require high data transfer rates.

Before describing the details of the present invention, it may be helpful to first present a simplified explanation of ARQ retransmission and how it applies to 3G networks.

Referring to FIG. 1, there is depicted a simplified block diagram of a conventional communication network 100 comprising a communications channel 110, an acknowledgement channel 112, a reception node 104 and a transmission node 102. In an existing ARQ retransmission method, the transmission node 102 is adapted to send packets stored in a memory unit 106, which can also be referred to as a transmission buffer, along the communication channel 110 to a reception memory unit 108, which can also be referred to as a reception buffer, for examination. Circuitry in the reception node 104 is adapted to examine the incoming packets in the reception memory unit 108 to determine whether they have been transmitted successfully, as further discussed below. If the reception node 104 receives a packet that contains corrupted data, the reception node 104 circuitry is adapted to send a status or acknowledgement message back to the transmission node 102 on the acknowledgement channel 112. More to the point, the reception node 104 will only be adapted to send an acknowledgement when corrupted data is received. This type of ARQ retransmission method is known in the art as a "negative" acknowledgement (NACK) method.

Alternatively, the reception node 104 may be adapted to send an acknowledgement via the acknowledgement channel 112 to the transmission node 102 only when it is determined that a packet sent via communication channel 110 has been received without errors. This type of ARQ retransmission method is known in the art as a "positive" acknowledgement method. In this method, the transmission node 102 is adapted to wait for a predetermined time period to receive an acknowledgement from the reception node 104. If an acknowledgement is not received within the predetermined time period, the transmission node 102 is adapted to retransmit the unacknowledged packet stored in the memory unit 106 to the reception node 104.

It is known in the art that positive and negative ARQ retransmission methods can be combined into a "general" ARQ retransmission method where acknowledgements are sent from a reception node to a transmission node on an acknowledgement channel for every previously transmitted packet in the memory unit. Based on the received acknowledgements, the transmission node will be adapted to determine whether a given previously transmitted packet stored in the memory unit needs to be retransmitted to the reception node. Generally, the transmission node is adapted to wait until it receives an acknowledgement before it makes any decision on whether to continue to hold previously transmitted packets in the memory unit or to clear the unit for the next incoming stream of packets.

As mentioned above, a specific use of a general ARQ retransmission method is in 3G networks. Within a so-called "protocol stack" of a 3G network, a radio link control (RLC) layer contains protocols (e.g., a series of set instructions) used to carry out ARQ retransmission. FIG. 2 is a simplified block diagram illustrating components of an RLC layer 200 relevant to our discussion. As shown, layer 200 comprises a transmission unit 202 and reception unit 210.

The path of a packet can be traced through the RLC layer 200. Upper layer(s) 102u send upper layer frames to the transmission unit 202 which is adapted to process such frames as follows. Before the upper layer frames can be transmitted, segmenting unit 204 is adapted to segment and/or concatenate them into packets. Thereafter, an RLC header unit 206 is adapted to add an RLC header to each packet. Packets are then placed in the memory unit 106 to wait for transmission. (Note that the memory unit may function as either a transmission or retransmission buffer and that these elements may be implemented either by one device, separate devices, platforms, programs or the like). A multiplexer circuit 208 is adapted to select which packets from memory unit 106 will be transmitted during a next "transmission time interval" (TTI) and to calculate when the selected packets will be submitted to a lower layer 102*l* for actual transmission. If the memory unit 106 is implemented using separate transmission and retransmission elements, the selected packets can come from the transmission buffer element, retransmission buffer element or both.

In an alternative embodiment, a Medium Access Control ("MAC") layer (not shown) determines the number of packets which can be transmitted per TTI and sends this information to RLC Layer 200 via pathway 300. Header unit 206 is then further adapted to set certain fields, which may represent a variety of protocol variables, within each packet selected for transmission.

Subsequently, selected packets are transmitted via transmission lower layer section 102*l* to reception lower layer 104*l*.

The reception section 210 is adapted to receive transmitted packets from the reception lower layer 104*l*. An expansion unit 212 is adapted to expand the received packets into separate packets and to place them in a reception memory unit 108 until packets associated with an entire reconstructed upper layer frame have been received.

At this point, the reception section 210 is adapted to generate and send acknowledgements and status information on individual packets stored in the reception memory unit 108 to the transmission section 202 as follows. A transceiving unit 214 is adapted to analyze whether the packets within the reception memory unit 108 have been received without errors. The unit 214 is further adapted to send this information to a transmission unit 216 via reverse link 212.

Unit 216 is adapted to control a multiplexer circuit 208 in order to select packets for transmission during the next TTI. When packets are successfully received and acknowledged, a reception header unit 218 is adapted to remove the RLC header from each packet, reassemble the frame and to send a reassembled frame to upper layer 104*u*. For any retransmission protocol, where no retransmission is allowed unless a negative acknowledgement is received, protocol stalling or deadlock may happen if no spontaneous polling is implemented at the transmission node. Protocol stalling is a special situation where no transmission is allowed even though there are packets available at the transmission node. Protocol Stalling is typically caused by a number of factors, such as an insufficient transmission window size, a lost acknowledgement or infrequent acknowledgements.

Protocol stalling degrades network throughput and delays the transmission of packets.

Spontaneous polling techniques minimize incidents of protocol stalling. Generally, in a spontaneous polling technique a transmission node sends polling signals to a reception node when protocol stalling is detected. Spontaneous polling techniques operate together with other polling techniques in normal operation and only apply when the protocol stalling occurs. Existing RLC protocols indicate that spontaneous polling may be used, but fail to provide sufficient details so that a workable technique can be developed.

Therefore, there is a need in the art for spontaneous polling techniques which can be used in wireless and wire line communications networks to prevent protocol stalling.

SUMMARY

The present invention overcomes the above described problems in the prior art by providing techniques for preventing protocol stalling. A control platform is adapted to generate a predetermined time period, wherein the predetermined time period is reset when an acknowledgement signal is received. The control platform is further adapted to examine stored packets to detect new or negatively acknowledged packets. A transmission platform is adapted to transmit an earliest transmitted packet after the predetermined time period expires when no new or negatively acknowledged packets are detected.

Other features of the present invention will become apparent upon reading the following detailed description of the invention, when taken in conjunction with the accompanying drawings and the appended claims.

DETAILED DESCRIPTION OF THE INVENTION

Those skilled in the art should note that while certain elements of the following invention are referred to as transmission or reception nodes, the functions of these elements can be carried out by one program, module or a device, such as a transceiver. The nomenclature in the discussion above and below is used merely to present features and functions of the invention in a clearer form, rather than to limit any particular program module or device that may be utilized to implement these features and functions.

One embodiment of the present invention is implemented within a 3G communication network. However, the present invention is robust enough to be applied to any communication network that employs a spontaneous polling protocol. The protocol stack for a preferred 3G communication protocol consists of a few layers, among them the RLC layer, a lower layer and a MAC layer. The present invention envisions the retransmission of packets using spontaneous polling from the RLC layer.

Figure 1:
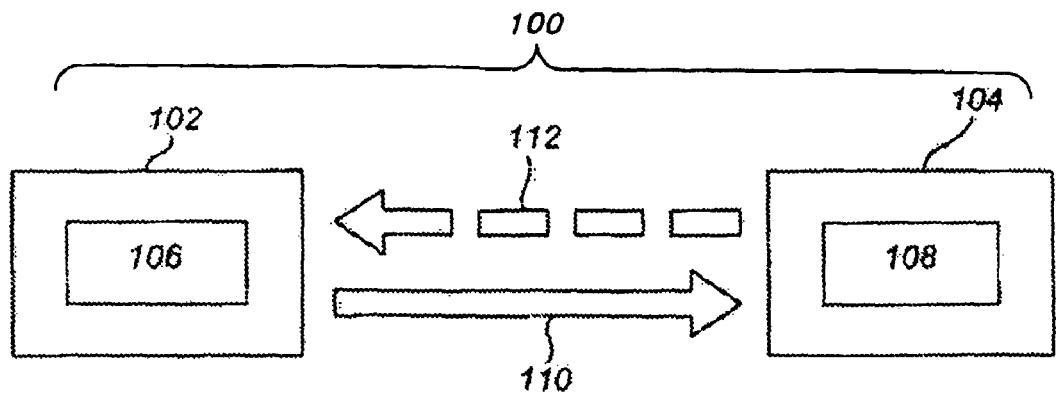
FIG. 1 is a simplified block diagram of a conventional communication network with an acknowledgement channel from a reception node to a transmission node.
Figure 2:
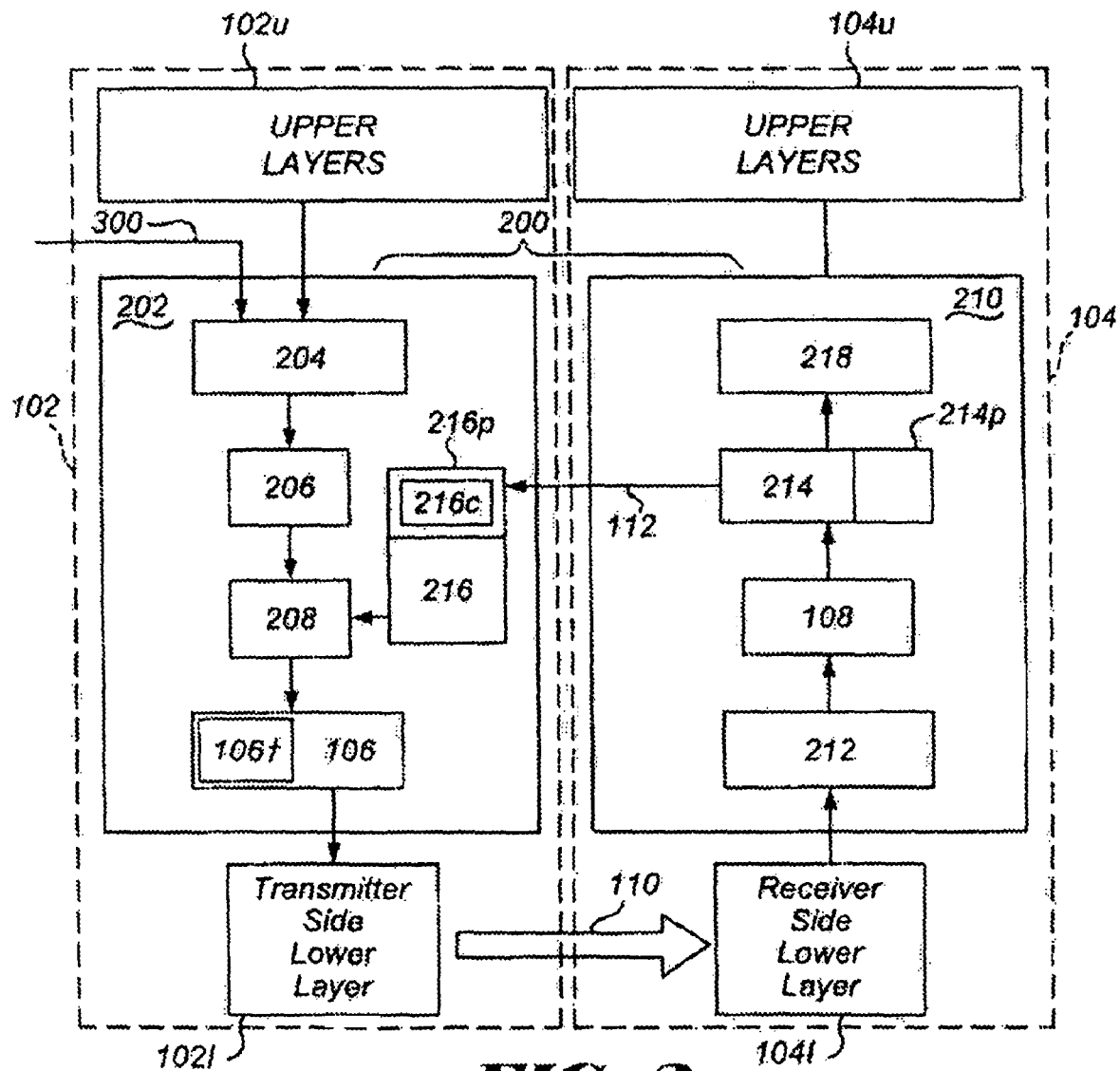
FIG. 2 is a simplified block diagram illustrating elements of an RLC layer which may be used to carry out techniques envisioned by the present invention.

Before going any further, it should be understood that the elements shown in FIG. 2 may be modified to carry out the features and functions envisioned by the present invention described above and below.

Figure 3:
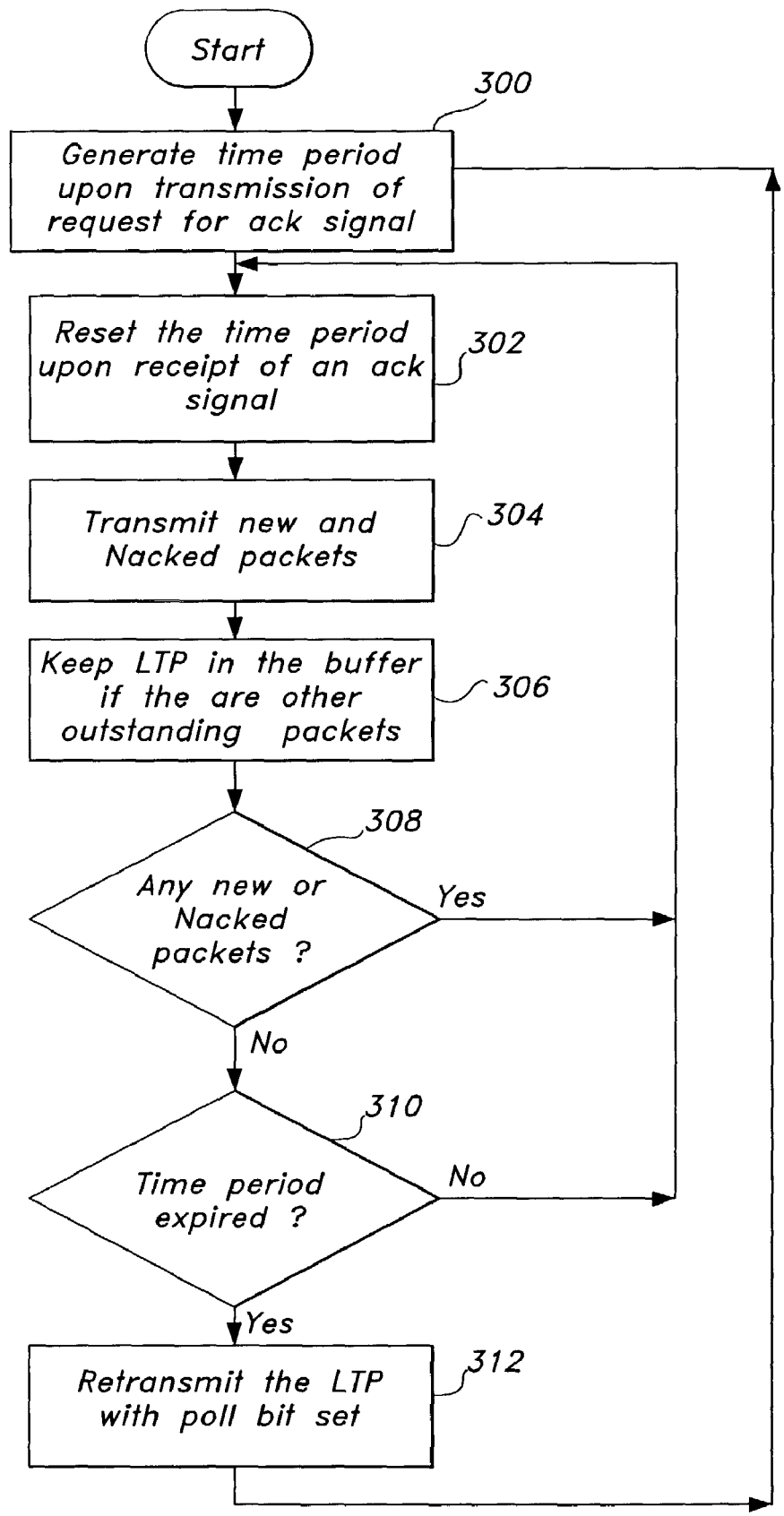
FIG. 3 is a flow diagram illustrative of techniques according to one embodiment of the present invention.

FIG. 3 is a simplified flow diagram illustrative of the operation of platforms 214*p* and 216*p* according to one embodiment of the present invention. It should be understood that platforms 214*p* and 216*p* may comprise hardware, software, firmware or any combination of these elements adapted to implement the various features and functions described below. In one embodiment of the invention, platform 216*p* is adapted to generate a predetermined time period upon the transmission of a polling signal from platform 216*p* as in step 300. Platform 216*p* is adapted to reset the time period when it receives an acknowledgment signal as in step 302. Platform 216*p* is adapted to transmit newly arrived packets or retransmit negatively acknowledged packets as in step 304. The last transmitted packet (LTP) which has the highest packet sequence number remains in unit 106 as long as there are other outstanding packets ready for transmission as in step 306. In one embodiment, platform 216p comprises a control platform 216c that is adapted to examine packets stored in unit 106. If platform 216c determines that there are no negatively acknowledged packets or new packets in unit 106 as in step 308, platform 216c will determine that protocol stalling might occur. If an acknowledgement signal is not received by platform 216p before the time period expires as in step 310, platform 216p is adapted to retransmit the LTP to platform 214p, as in step 312, to poll platform 214p for an acknowledgement signal. In one embodiment, platform 216p is adapted to set a "poll bit", which may comprise the header of the LTP, to poll platform 214p for an acknowledgment signal.

An advantage of this embodiment is that it increases the successful probability that platform 214p will be able to detect all missing packets with sequence numbers lower than the LTP.

Figure 4:
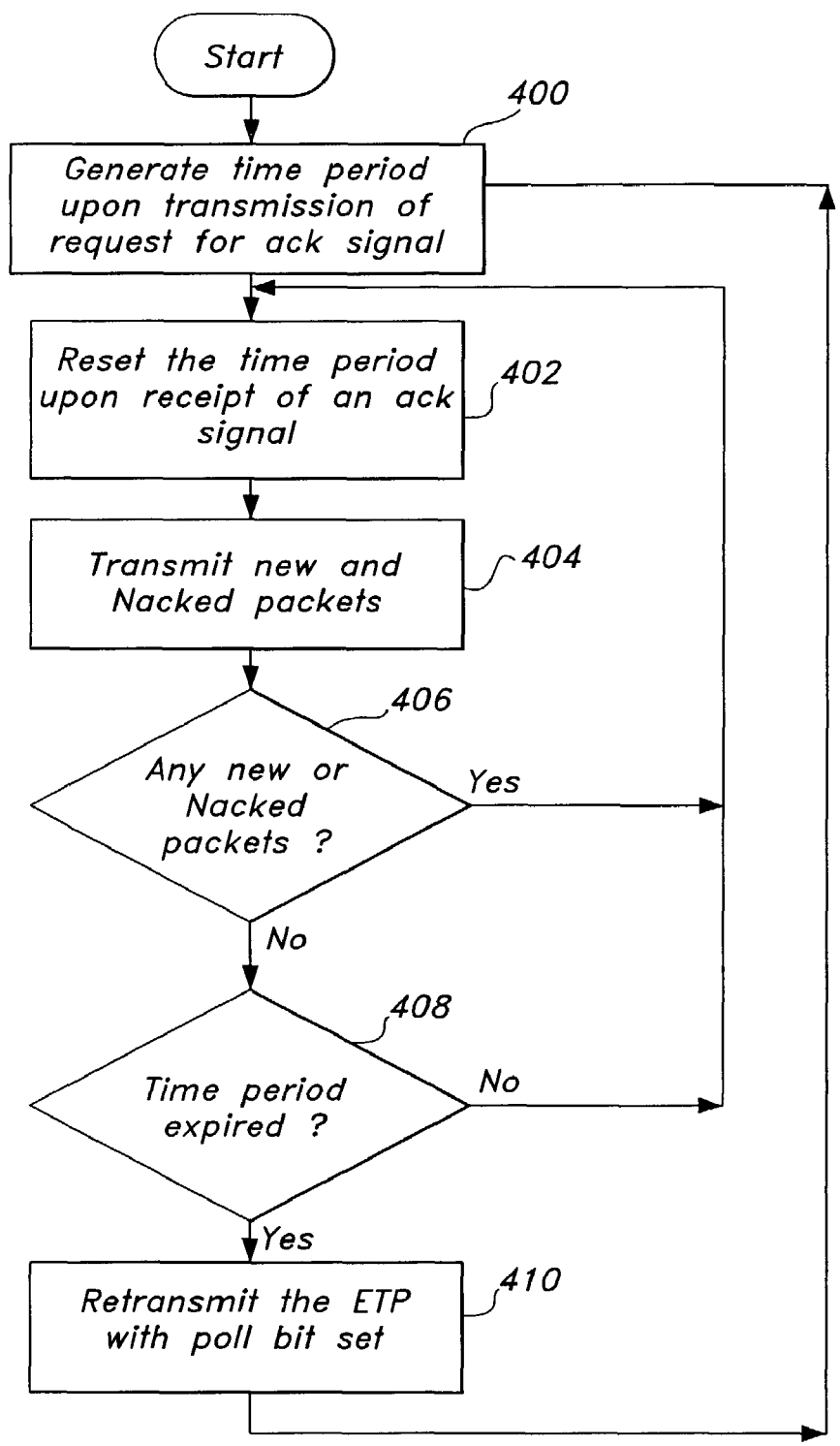
FIG. 4 is a flow diagram illustrative of techniques according to embodiments of the present invention.

FIG. 4 is a flow diagram illustrative of embodiments of the present invention. In one embodiment, the LTP, which has the highest packet sequence number, is not always kept in unit 106. Platform 216p is adapted to discard the LTP if it is positively acknowledged. If an acknowledgement signal is not received by the platform 216p before the time period expires as in step 408, platform 216p is adapted to retransmit an "earliest transmitted packet" (ETP) to platform 214p, as in step 410, to poll platform 214p for an acknowledgement signal. In one embodiment platform 216p is adapted to set a "poll bit", that may comprise the header of the ETP, to poll platform 214p for an acknowledgement signal.

An advantage of this embodiment is that retransmitting the ETP reduces the probability that the ETP will be dropped by platform 216p if it has not been acknowledged by platform 214p for a long time.

Figure 5:
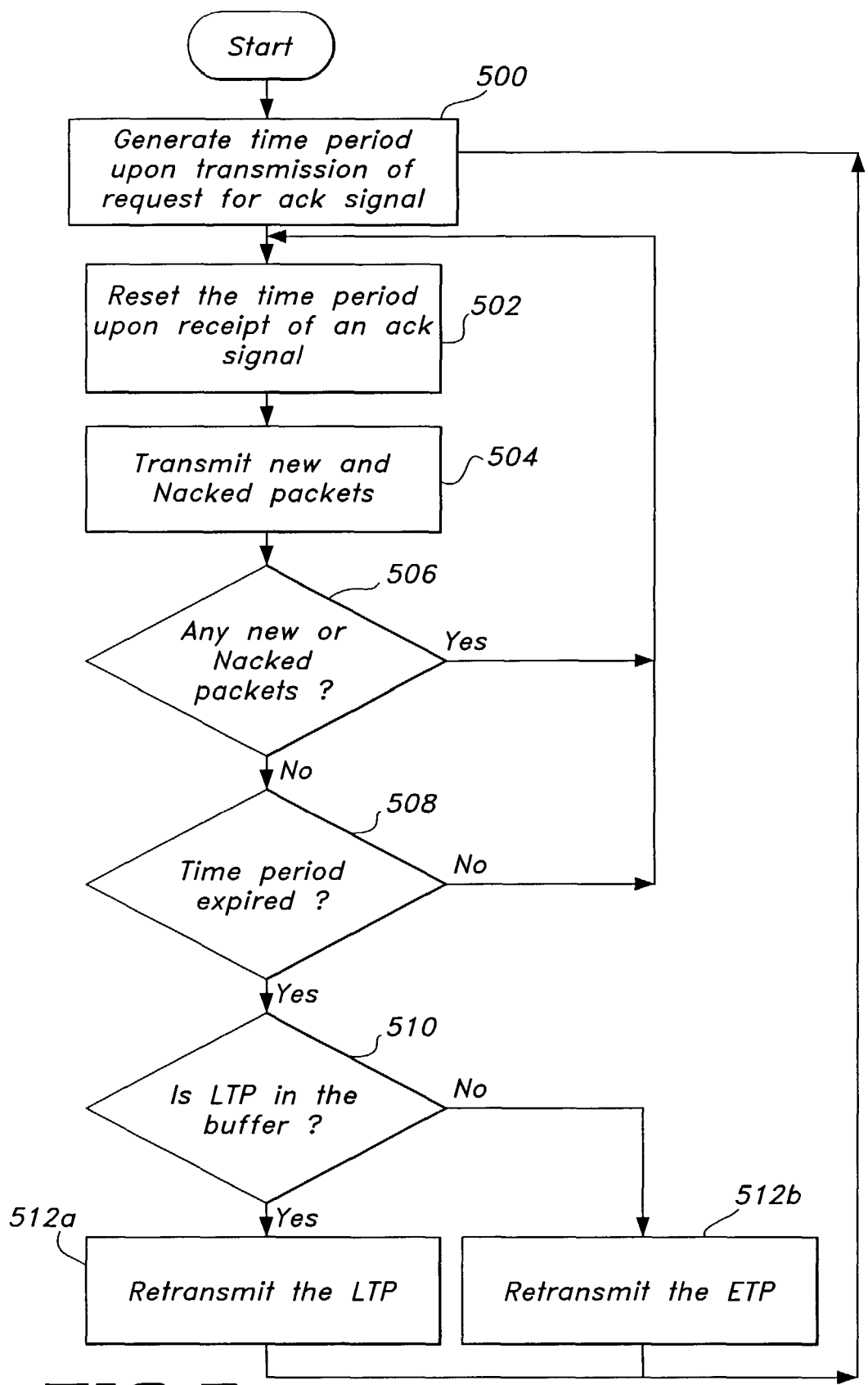
FIG. 5 is a flow diagram illustrative of techniques according to embodiments of the present invention.

FIG. 5 is a flow diagram illustrative of embodiments of the present invention. The LTP, which has the highest packet sequence number, is not always kept in unit 106. Platform 216p is adapted to remove the LTP if it is positively acknowledged. If an acknowledgement signal is not received by the platform 216p before the time period expires as in step 508, control platform 216c is adapted to examine whether the LTP is in unit 106 as in step 510. If the LTP is still in unit 106, platform 216p is adapted to retransmit the LTP to poll platform 214p for an acknowledgement signal as in step 512a. In one embodiment, platform 216p is adapted to set a "poll bit", which may comprise the header of the LTP, to poll platform 214p for an acknowledgment signal. If the LTP is not in the memory unit, platform 216p is adapted to retransmit the ETP to poll platform 214p for an acknowledgement signal as in step 512b. In one embodiment, platform 216p is adapted to set a "poll bit", that may comprise the header of the ETP, to poll platform 214p for an acknowledgement signal.

In more detail, control platform 216c is adapted to delete copies of each previously transmitted packet, which have been stored in unit 106, from unit 106 provided an acknowledgement, either positive or negative, has been received from the platform 214p. The unit 106 is adapted to store copies of each new packet that arrives at node 102. It is also adapted to store copies of packets that are already transmitted but have not been positively acknowledged. Those packets comprise the negatively acknowledged and outstanding packets. Once a packet has been positively acknowledged, platform 216p is adapted to delete its copy from unit 106 with the exception that the LTP may be held in unit 106 even if it is acknowledged. The platform 216p is adapted to transmit all originally transmitted and negatively acknowledged packets before transmitting a spontaneous polling signal according to the present invention.

In one embodiment of the invention, the control platform 216c is adapted to generate a predetermined time period when a polling signal is transmitted from platform 216p. This time period will be used to prevent stalling by unacknowledged packets after all originally transmitted and negatively acknowledged packets are transmitted. That is, instead of waiting an indefinite period of time to receive an acknowledgement signal for unacknowledged packets, which may never occur or which may be delayed, thus causing the unit 102 to stall, the platform 216p is adapted, after the unit 106 has no new or negatively acknowledged packets to transmit as in step 308, 406, and 506 and at the end of the predetermined time period in step 310, 408, and 508, to prompt unit 214p to send a next acknowledgement signal by transmitting an outstanding packet as in step 312, 410, 510a or 512b.

Back tracking somewhat, in one embodiment of the invention the LTP comprises the packet which was the last one to be originally transmitted by unit 102l, regardless of whether or not it has been acknowledged. That is, in this embodiment, even if an acknowledgement associated with the LTP has been received by unit 106, it is not deleted.

In an alternative embodiment of the invention, the ETP comprises a packet which was the earliest one to be originally transmitted by unit 102l, if it has not been acknowledged. That is, in this embodiment, if the ETP has been negatively acknowledged, it will not be used as a spontaneous polling signal. Instead, platform 216p is adapted to identify a packet within the unit 106 which has not been deleted (and therefore one that has not been acknowledged) which was transmitted at the earliest time (e.g., the earliest transmitted packet remaining in the buffer that has not been acknowledged).

Once again, it should be understood that during a predetermined time period, new packets which arrive at unit 102 are transmitted without being delayed as in step 302. That is, copies of these new packets are stored in unit 106 along with copies of unacknowledged packets which have been previously received and transmitted. Therefore, they are sent to lower layer 102l to be transmitted. In this manner, the retransmission of unacknowledged packets will not delay the original transmission of new packets (i.e., stalling will be prevented).

So far we have assumed that after a predetermined time period begins to run, no acknowledgement signal is received by platform 216p, before the time period expires. This may not always be the case. Rather, sometimes a next acknowledgement signal is received from platform 214p before a time period expires. In this case, the predetermined time period is reset as in step 302, 402, and 502.

Those skilled in the art may be aware of the fact that other types of polling signals may be sent at different times by unit 102l to request an acknowledgement. However, these polling signals and acknowledgements (i.e., these techniques) have nothing to do with the prevention of stalling as envisioned by the present invention.

Further alternative embodiments of the present invention illustrate some examples of the form of the polling signal.

In one embodiment of the present invention, the platform 216p is adapted to set a "polling bit" within the "header" portion of a packet to a positive '1' value.

In another embodiment of the present invention, the platform 216p is adapted to delete the LTP when a positive acknowledgement associated with the packet is received. Once deleted, the ETP must be used as the polling signal.

Figure 6:
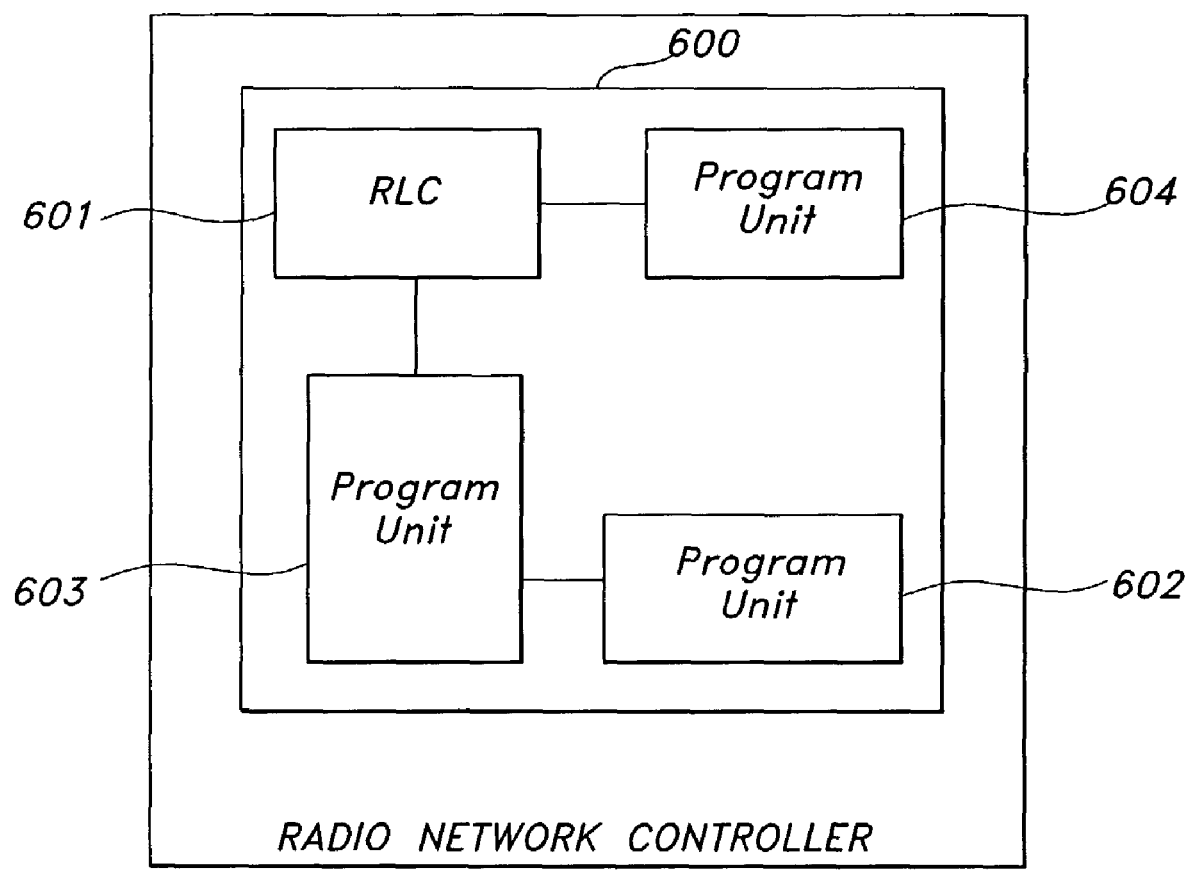
FIG. 6 is a block diagram of a radio network controller according to one embodiment of the present invention.

FIG. 6 is a simplified block diagram of a device 600, such as a traffic processing unit (TPU) adapted to transmit spontaneous polling signals according to one embodiment of the present invention. TPU 600 may comprise one or more platforms 601-604 for carrying out the features and functions of the present invention described above. TPU 600 may be located within a radio network controller.

The present invention has been described with regard to particular embodiments, all of which are intended to be illustrative rather than restrictive. Alternate embodiments will become apparent to those skilled in the art to which the present invention pertains without departing from its spirit and scope. For example, some or all of the components in the platforms may be combined or further divided into additional platforms. Further, each component may comprise a program or programs, hardware or some combination of the two adapted to carry out the features and functions of the inventions described above and below. The scope of the present invention is described by the appended claims and supported by the foregoing description.

We claim:

1. A device for preventing protocol stalling, the device comprising a memory, the memory storing:
   a control platform operable to utilize a predetermined time period associated with a group of packets, wherein the predetermined time period is reset for the group of packets when an acknowledgement signal is received;
   the control platform further operable to examine stored packets to detect new or negatively acknowledged packets; the control platform further operable to examine stored packets to detect a last transmitted packet;
   a transmission platform operable to transmit the last transmitted packet from among the stored packets after the predetermined time period expires when no new or negatively acknowledged packets are detected if the last transmitted packet is detected and
   further operable to transmit an earliest transmitted packet after the predetermined time period expires when no new or negatively acknowledged packets are detected if the last transmitted packet is not detected.

2. The device of claim 1, wherein the earliest transmitted packet comprises a signal operable to request an acknowledgement signal.

3. The device of claim 1, wherein the control platform is further operable to generate the predetermined time period when the earliest transmitted packet is transmitted.

4. The device of claim 1, wherein the control platform is further operable to generate the predetermined time period by utilizing an RLC protocol Poll Timer.

5. The device of claim 1, further comprising a reception unit operable to receive at least one acknowledgement signal.

6. The device of claim 1, wherein the device comprises a traffic processing unit.

7. The device of claim 1, wherein the last transmitted packet comprises a signal operable to request an acknowledgement signal.

8. The device of claim 1, wherein the control platform is further operable to retain the last transmitted packet.

9. The device of claim 1, wherein the control platform is further operable to generate the predetermined time period when the last transmitted packet is transmitted.

10. A method for preventing protocol stalling, comprising:
    generating a predetermined time period associated with a group of packets, wherein the predetermined time period is reset for the group of packets when an acknowledgement signal is received,
    examining stored packets to detect new or negatively acknowledged packets and to detect a last transmitted packet;
    transmitting the last transmitted packet from among the stored packets after the predetermined time period expires when no new or negatively acknowledged packets are detected if the last transmitted packet is detected and
    further transmitting an earliest transmitted packet after the predetermined time period expires when no new or negatively acknowledged packets are detected if the last transmitted packet is not detected.

11. The method of claim 10, wherein the earliest transmitted packet comprises a signal operable to request an acknowledgement signal.

12. The method of claim 10, wherein the predetermined time period is generated when the earliest transmitted packet is transmitted.

13. The method of claim 10, further comprising generating the predetermined time period by utilizing an RLC protocol Poll Timer.

14. The method of claim 10, further comprising receiving at least one acknowledgement signal.

15. The method of claim 10, wherein the last transmitted packet comprises a signal operable to request an acknowledgement signal.

16. The method of claim 10, further comprising retaining the last transmitted packet.

17. The method of claim 10, wherein the predetermined time period is generated when the last transmitted packet is transmitted.

* * * * *